UNITED STATES PATENT OFFICE.

ABEL D'ESTAMPES, OF NEW ORLEANS, ASSIGNOR OF PART OF HIS RIGHT TO PATRICK LEONARD, OF THE PARISH OF PLAQUEMINES, LA.

IMPROVEMENT IN ARTIFICIAL KAOLIN.

Specification forming part of Letters Patent No. 187,971, dated March 6, 1877; application filed February 15, 1877.

*To all whom it may concern:*

Be it known that I, ABEL D'ESTAMPES, of the city of New Orleans, parish of Orleans, State of Louisiana, have invented a new and useful compound called "Artificial Kaolin," which compound is fully described in the following specification:

This invention relates to the manufacture of porcelain; and it consists in a composition formed by pulverizing and mixing shells and white sand with feldspath.

To prepare the artificial kaolin, take an even quantity of shells and white sand, heat and pulverize the same, and then add enough water to work the whole into a paste. Afterward sift, press, and beat it, and add feldspath, the quantity of which varies according to the transparency and hardness wished to be obtained.

Having thus described my improved compound, I desire to claim—

Artificial kaolin, when formed of shells, white sand, and feldspath, as described, and for the purpose set forth.

ABEL D'ESTAMPES.

Witnesses:
 WM. H. SEYMOUR,
 R. H. SHANNON.